June 24, 1947.　　A. C. CHAMBERS ET AL　　2,423,006
BRAKE SYSTEM
Filed July 10, 1944　　3 Sheets-Sheet 1

INVENTORS
ALLAN C. CHAMBERS
FRANK B. WILLIS
BY T. J. Plante
ATTORNEY

INVENTORS
ALLAN C. CHAMBERS
FRANK B. WILLIS
BY
ATTORNEY

INVENTORS
ALLAN C. CHAMBERS
FRANK B. WILLIS
BY T. J. Plante
ATTORNEY

Patented June 24, 1947

2,423,006

UNITED STATES PATENT OFFICE 2,423,006

BRAKE SYSTEM

Allan C. Chambers and Frank B. Willis, South Bend, Ind., assignors to Bendix Aviation Corporation, South Bend, Ind., a corporation of Delaware Application July 10, 1944, Serial No. 544,178

6 Claims. (Cl. 192—3)

This invention relates to vehicle controls, and particularly to those members which are under the direct control of the operator.

An object of the invention is to provide means for preventing accidental opening of the throttle when the brakes are being applied. In other words, it is intended to avoid the complications resulting from accidental contact of the operator's foot with the accelerator treadle when he is pushing on the brake pedal.

It sometimes happens that the edge of the operator's foot, as he pushes down on the brake pedal, catches the accelerator treadle, with the result that the opening of the throttle tends to defeat the operator's purpose in applying the brakes. The possibility of such an occurrence is perhaps greater where the brake pedal in released position is at substantially the same level as the accelerator treadle, an arrangement which has been proposed for the purpose of simplifying shifting of the operator's foot back and forth between the brake and accelerator treadles.

Other objects and advantages of the invention will become apparent during the course of the following description, reference being had therein to the accompanying drawings, in which.

Figure 1:
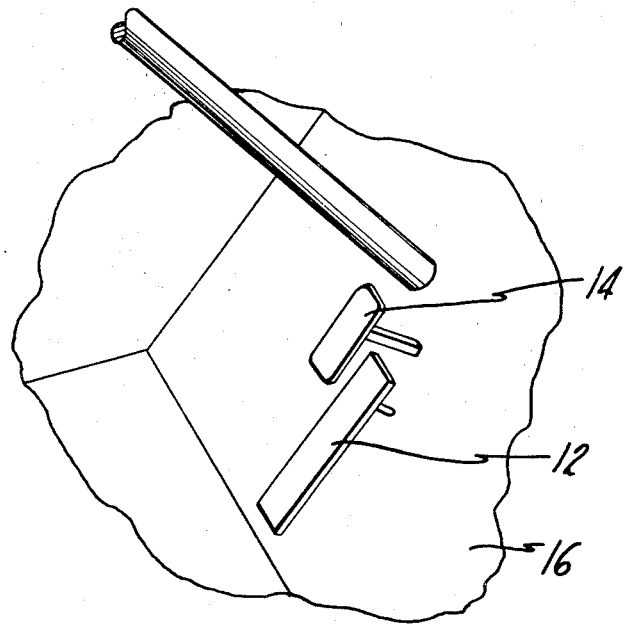
Figure 1 is an isometric view showing a brake pedal and accelerator treadle positioned in the driving compartment of an automotive vehicle.

Referring to Figure 1, an accelerator treadle 12 and brake pedal 14 are shown in released position above the floor board 16 of the vehicle. It will be apparent from this view that the operator can quite easily make the mistake of catching the accelerator treadle with the edge of his foot when he pushes down on the brake pedal. The consequent opening of the throttle will tend to speed up the engine, thus requiring greater effort on the part of the operator in stopping the vehicle, assuming of course that the clutch has not been disengaged. Most drivers usually apply the brakes to some extent at least before disengaging the clutch. However, even if the clutch is disengaged before the brake pedal is displaced, an accidental speeding of the engine is certainly undesirable, since it may confuse the operator and thus impair his control of the vehicle.

Figure 2:
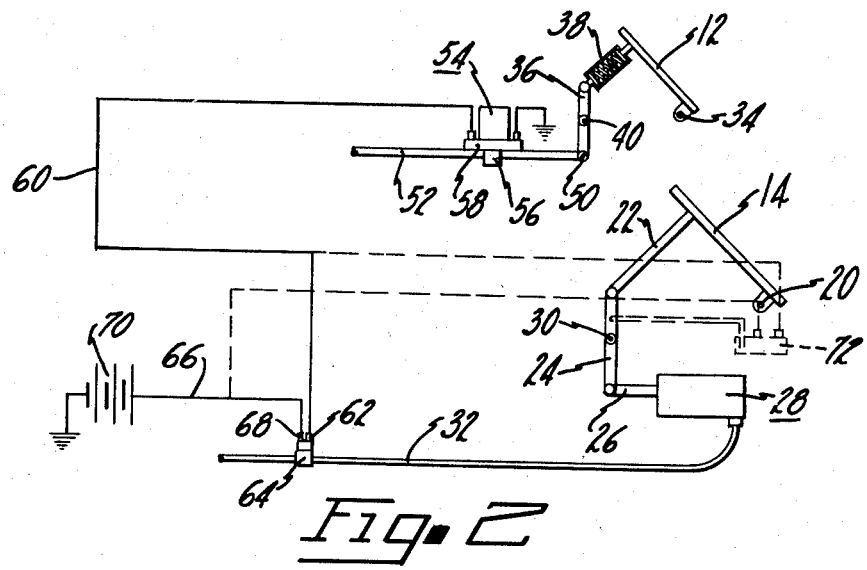
Figure 2 is a diagrammatic sketch showing an arrangement for preventing undesired opening of the throttle when the brakes are being applied.

In Figure 2, a brake pedal or treadle 14, which is pivoted at 20, is connected by means of a rod 22 and lever 24 to a rod 26 which actuates master cylinder 28, the lever 24 being pivoted at 30. Fluid from the master cylinder is displaced in the usual manner through conduit 32 to apply the brakes.

The accelerator treadle 12 is pivoted at 34, and is connected to a lever 36 through a yieldable connection 38. This yieldable connection incorporates a compression spring which is sufficiently strong to overcome resistance in the throttle control linkage. Therefore, the force exerted on the accelerator treadle to operate the throttle will normally be insufficient to compress the spring, and therefore the throttle linkage will be actuated in the usual manner. The lever 36 is pivoted at 40 and connected at 50 to a rod 52 which operates the throttle. As the accelerator treadle is pushed downward, or in other words in a counterclockwise direction, rod 52 is moved toward the right to open the throttle.

Means are provided for resisting movement of throttle rod 52 whenever the brakes are being applied. A solenoid, indicated generally at 54, is provided with an armature 56, having an opening through which the rod 52 extends. Energization of solenoid 54 draws armature 56 upwardly to clamp the rod 52 against the base 58 of the solenoid housing, thus preventing movement of the rod 52, and thereby preventing the throttle from being opened while the brakes are being applied.

The control circuit for solenoid 54 may comprise a wire 60 connecting the solenoid to one terminal 62 of stop light switch 64, and a wire 66 connecting terminal 68 of the stop light switch to a source of current such as the battery 70.

As soon as sufficient pressure is created in master cylinder 28 to close the stop light switch (and this usually requires only a very light pressure), the electric circuit is closed to energize the solenoid and lock throttle rod 52. Thus, even if the operator's foot unintentionally pushed on the accelerator treadle as the operator applied the brakes, the throttle would not be caused to open. Instead, the spring in the yieldable connection 38 would be compressed as the accelerator treadle moved down.

An optional control for the electric circuit which energizes the solenoid 54 is shown in dotted lines. In this case the switch 72, which is controlled by initial movement of brake pedal 14, takes the place of stop light switch 64.

Figure 3:
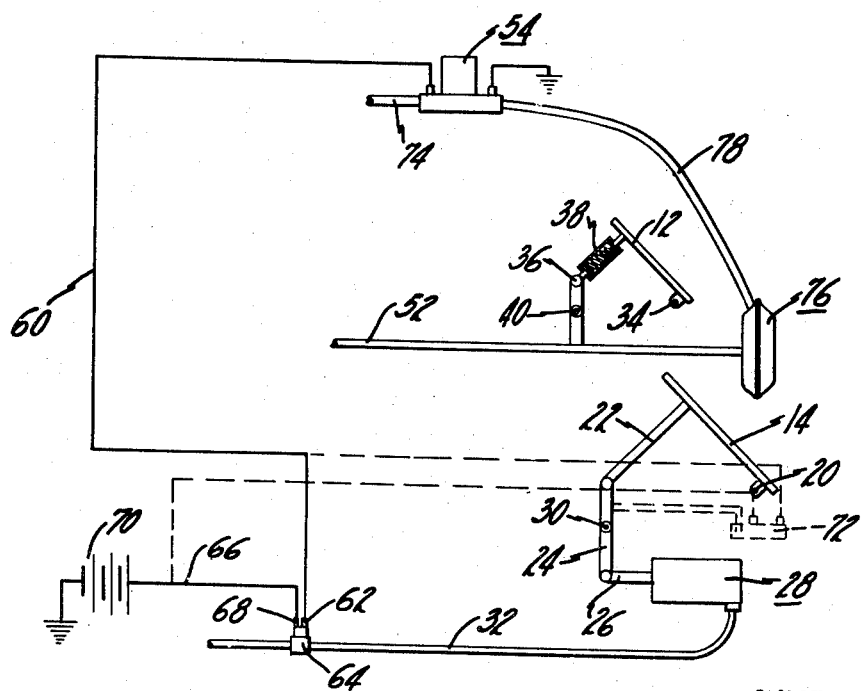
Figure 3 is a diagrammatic showing of a modification of the arrangement of Figure 2.

In the device shown in Figure 3, solenoid 54 controls a valve which either opens or closes a vacuum line 74, connected to a vacuum source, such as the conventional intake manifold. When the solenoid is energized the valve is open to connect the left side of diaphragm chamber 76 to vacuum through conduit 78. This creates a pressure differential over the diaphragm in chamber 76 with the result that a pressure is exerted tending to close the throttle, this pressure tending to move the rod 52 toward the left. If the accelerator treadle is accidentally pushed down it will, as before, only compress the spring in yieldable connection 38. Control of the solenoid energizing circuit will be the same as in Figure 2.

Figure 4:
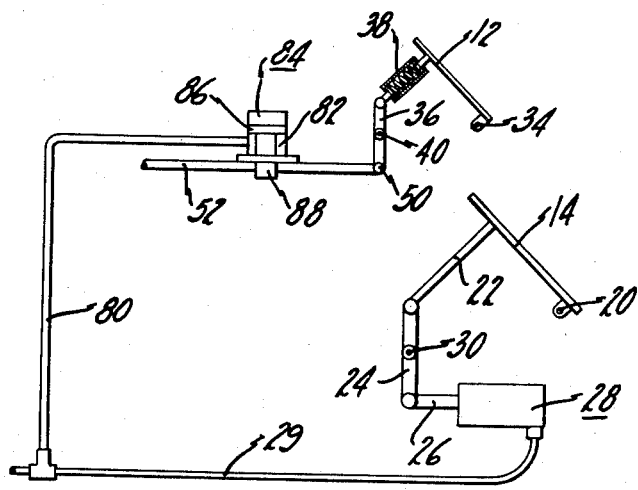
Figure 4 is a diagrammatic showing of a further modification.

Figure 4 shows the use of direct hydraulic pressure to prevent undesired opening of the throttle. Actuation of brake pedal 14 forces fluid under pressure out of master cylinder 28 through conduit 29 to the brake cylinders. A branch conduit 80 leads to a chamber 82 in a cylinder 84, wherein the pressure of the fluid acts against piston 86 to move piston extension 88 upwardly and clamp rod 52 in position. Again, accidental pressure on the accelerator treadle compresses the spring in yieldable connection 38.

Figure 5:
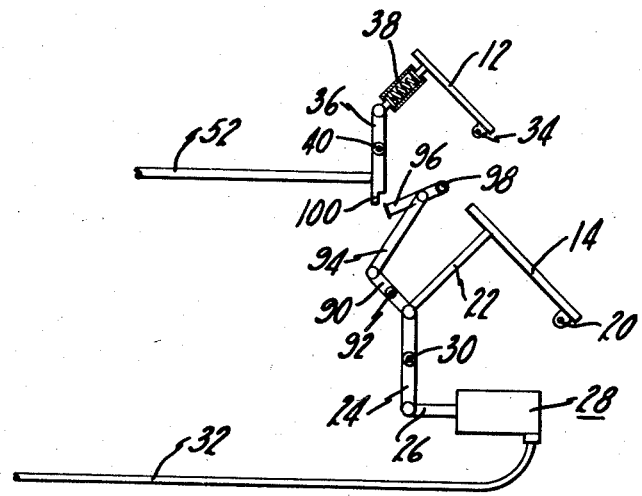
Figure 5 shows yet another modification of the invention.

Figure 5 shows the accomplishment of the object with mechanical linkage. Counterclockwise movement of brake treadle 14 simultaneously actuates master cylinder 28 and causes clockwise rotation of lever 90 about the pivot 92, thus exerting a pressure through link 94 to turn member 96 in a clockwise direction about the pivot 98 to bring the left end of said member 96 into a position where it will block movement to the right of extension 100 on the lever which moves the throttle rod 52. Thus, if the brake pedal is pushed down, the throttle will be prevented from opening because rod 52 cannot move toward the right. Accidental downward movement of the accelerator treadle will only compress the spring loaded member 38.

Although particular embodiments of our invention have been described, it will be understood by those skilled in the art that the object of the invention may be attained by the use of constructions different in certain respects from those disclosed without departing from the underlying principles of the invention. We therefore desire by the following claims to include within the scope of our invention all such variations and modifications by which substantially the results of our invention may be obtained through the use of substantially the same or equivalent means.

We claim:

1. In a vehicle having an accelerator treadle which controls a throttle and a brake pedal for applying brakes, means for locking the throttle, means which respond automatically to brake applying movement of the brake pedal to operate said locking means, and resilient means between the accelerator treadle and the throttle for absorbing any thrust on the accelerator treadle subsequent to locking the throttle.

2. In a vehicle having an accelerator treadle which controls a throttle through a connecting rod, and a brake pedal which controls the vehicle brakes, a solenoid armature adapted when the solenoid is energized to lock the throttle connecting rod in position by frictionally clamping the same, an electric circuit controlling the solenoid and including a switch which is closed automatically as the vehicle brakes are applied, and a yieldable connection between the throttle connecting rod and the accelerator treadle permitting the treadle to be depressed even though the rod is locked.

3. In a vehicle having an accelerator treadle which controls a throttle through a connecting rod, and a brake pedal which controls the vehicle brakes, a power device arranged when actuated to act on the throttle connecting rod to urge the throttle to closed position, valve means for actuating the power device, a solenoid controlling operation of the valve means, an electric circuit controlling the solenoid and including a switch which is closed automatically as the vehicle brakes are applied, and a yieldable connection between the throttle connecting rod and the accelerator treadle permitting the treadle to be depressed even though the rod is urged to throttle closed position by the power device.

4. In a vehicle having an accelerator treadle which controls a throttle through a connecting rod, a hydraulic braking system, and a pedal which controls said braking system, a pressure responsive member acted on by the pressure in the braking system and adapted to lock the throttle connecting rod in position under the influence of said pressure, and a yieldable connection between the throttle connecting rod and the accelerator treadle permitting the treadle to be depressed even though the rod is locked.

5. In a vehicle having an accelerator treadle which controls a throttle through a connecting rod, and a pedal which controls the vehicle braking system, mechanical linkage acted on by the brake control pedal and adapted to lock the throttle connecting rod in position, and a yieldable connection between the throttle connecting rod and the accelerator treadle permitting the treadle to be depressed even though the rod is locked.

6. In a vehicle having a throttle, a brake, an accelerator treadle to control the throttle, a brake pedal to control the brake, and linkage connecting the accelerator treadle to the throttle, means for preventing movement of said linkage in the throttle opening direction, means which respond automatically to movement of the brake pedal in the brake applying direction to operate said movement preventing means, and a spring inserted in the aforesaid linkage between the accelerator treadle and the throttle having sufficient resistance to overcome the normal resistance in the throttle control system, but being compressible to absorb any thrust on the accelerator treadle subsequent to operation of said movement preventing means.

ALLAN C. CHAMBERS.
FRANK B. WILLIS.

REFERENCES CITED

The following references are of record in the file of this patent:

UNITED STATES PATENTS

| Number | Name | Date |
|---|---|---|
| 1,633,360 | Bragg et al. | June 21, 1927 |
| 1,906,699 | Mallison et al. | May 2, 1933 |
| 2,189,221 | Paine et al. | Feb. 6, 1940 |